(12) United States Patent
Killebrew

(10) Patent No.: US 9,380,847 B1
(45) Date of Patent: Jul. 5, 2016

(54) MOBILE WORK STATION SYSTEM

(71) Applicant: Anthony W. Killebrew, Las Vegas, NV (US)

(72) Inventor: Anthony W. Killebrew, Las Vegas, NV (US)

(*) Notice: Subject to any disclaimer, the term of this patent is extended or adjusted under 35 U.S.C. 154(b) by 0 days.

(21) Appl. No.: 14/070,172

(22) Filed: Nov. 1, 2013

(51) Int. Cl.
 *A45C 9/00* (2006.01)
(52) U.S. Cl.
 CPC .................................... *A45C 9/00* (2013.01)
(58) Field of Classification Search
 CPC .............. A45C 9/00; A45C 2013/025; A45C 2013/028
 USPC ............ 190/11, 13 B, 36, 102, 1; 383/117, 4; 224/543; 108/44; 248/339
 See application file for complete search history.

(56) References Cited

U.S. PATENT DOCUMENTS

| | | | |
|---|---|---|---|
| 2,609,072 A * | 9/1952 | Levinson ........................ | 190/11 |
| 3,061,157 A * | 10/1962 | Moss ............................ | 224/484 |
| 4,856,627 A * | 8/1989 | Polatov ........................... | 190/11 |
| 5,524,754 A * | 6/1996 | Hollingsworth ...... | G06F 1/1628 190/111 |
| 5,762,170 A | 6/1998 | Shyr | |
| 6,354,477 B1 | 3/2002 | Trummer | |
| 6,454,064 B1 * | 9/2002 | Cheng ............................ | 190/11 |
| 7,106,014 B1 * | 9/2006 | Mastalir et al. .............. | 318/280 |
| 7,278,644 B2 * | 10/2007 | Villarreal .................. | 280/47.26 |
| 7,997,211 B2 | 8/2011 | Peterson | |
| 8,333,443 B1 | 12/2012 | Abed | |
| 8,353,490 B2 | 1/2013 | Spinelli | |
| 8,467,176 B2 | 6/2013 | Daley, III | |
| 2003/0038149 A1 * | 2/2003 | Purpura ........................ | 224/275 |
| 2004/0112697 A1 * | 6/2004 | Scicluna ................ | A45C 13/02 190/110 |
| 2004/0134813 A1 * | 7/2004 | Domotor .................. | A45C 3/02 206/320 |
| 2007/0102893 A1 | 5/2007 | Mayo | |
| 2011/0056412 A1 * | 3/2011 | Grammer et al. ................. | 108/6 |
| 2012/0090511 A1 * | 4/2012 | Underwood et al. ........... | 108/14 |
| 2012/0118210 A1 * | 5/2012 | Laughlin et al. ................ | 108/28 |
| 2012/0222931 A1 * | 9/2012 | Zuckerman ....................... | 190/2 |
| 2012/0248163 A1 | 10/2012 | Biddle | |

FOREIGN PATENT DOCUMENTS

EP          0628430 A1 * 12/1994

* cited by examiner

*Primary Examiner* — Sue A Weaver
(74) *Attorney, Agent, or Firm* — Neustel Law Offices; Jason L. Gilbert

(57) ABSTRACT

A mobile work station system which is adapted to be utilized in a wide range of locations for a wide range of uses, such as functioning as an eating table, work area, computer desk, television stand and the like. The mobile work station system generally includes a case including a first portion and a second portion. The first portion is hingedly secured to the second portion. A pair of cup holders extend from either side of the first portion for storing various beverages therein. A pair of dry-erase boards extend from either side of the second portion in a retractable manner. An attachment receiver is positioned on the lower end of the first portion for attaching a tripod attachment. A pair of mounting members are positioned within a slot formed in the second portion for suspending the present invention from various structures, such as a fence.

13 Claims, 10 Drawing Sheets

MOBILE WORK STATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a work station and more specifically it relates to a mobile work station system which is adapted to be utilized in a wide range of locations for a wide range of uses, such as functioning as an eating table, work area, computer desk, television stand and the like.

2. Description of the Related Art

Any discussion of the related art throughout the specification should in no way be considered as an admission that such related art is widely known or forms part of common general knowledge in the field.

Individuals who are constantly on the go often suffer from an inability to quickly and easily set up a work station regardless of the surrounding environment. For example, a baseball coach may find it difficult to organize notes, display plays or schemes, store drinks, and display various other devices (such as a television or computer) without requiring the usage of multiple cases or stations.

In other situations, individuals may not have an easy location to store a computer, television, or other device. For example, when camping, an individual may not have a location to store such a device which will protect the device from the environment while allowing flexibility regarding where to position the device.

Because of the inherent problems with the related art, there is a need for a new and improved mobile work station system which is adapted to be utilized in a wide range of locations for a wide range of uses, such as functioning as an eating table, work area, computer desk, television stand and the like.

BRIEF SUMMARY OF THE INVENTION

The invention generally relates to a work station which includes a case including a first portion and a second portion. The first portion is hingedly secured to the second portion. A pair of cup holders extend from either side of the first portion for storing various beverages therein. A pair of dry-erase boards extend from either side of the second portion in a retractable manner. An attachment receiver is positioned on the lower end of the first portion for attaching a tripod attachment. A pair of mounting members are positioned within a slot formed in the second portion for suspending the present invention from various structures, such as a fence.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
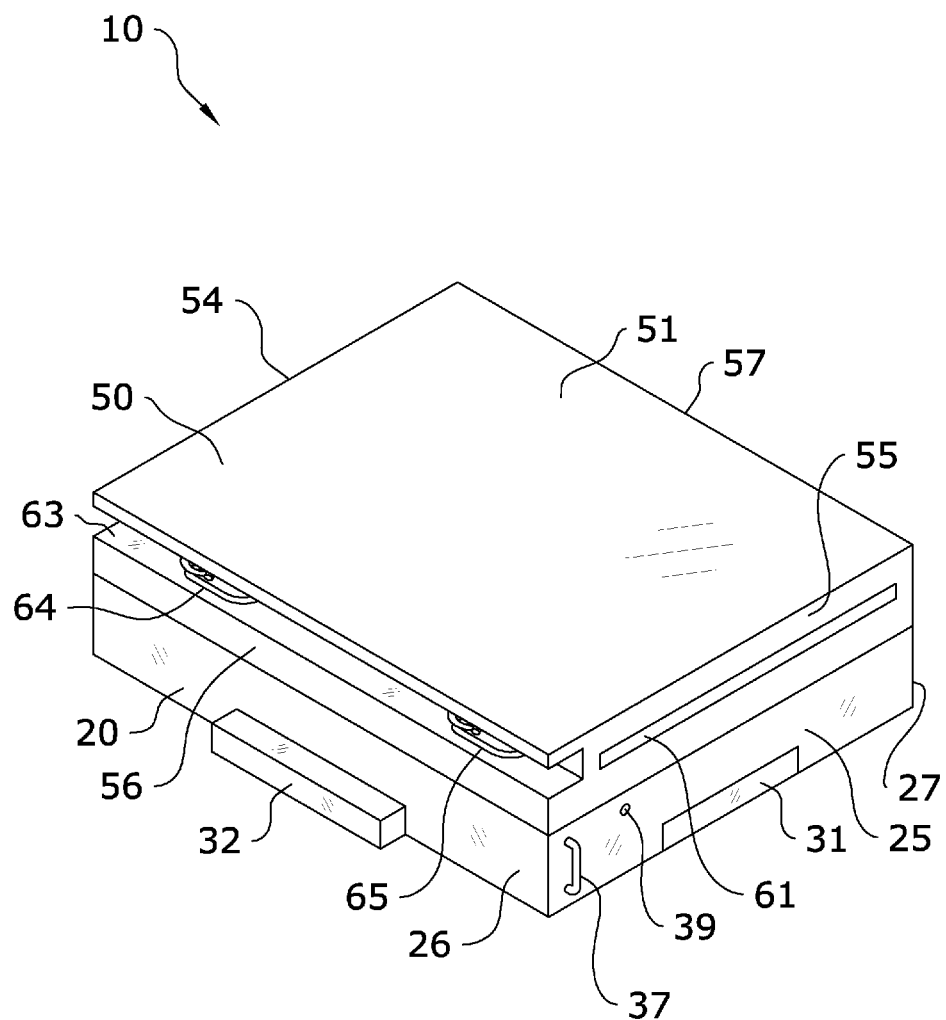
FIG. 1 is a first side upper perspective view of the present invention in a closed configuration.
Figure 2:
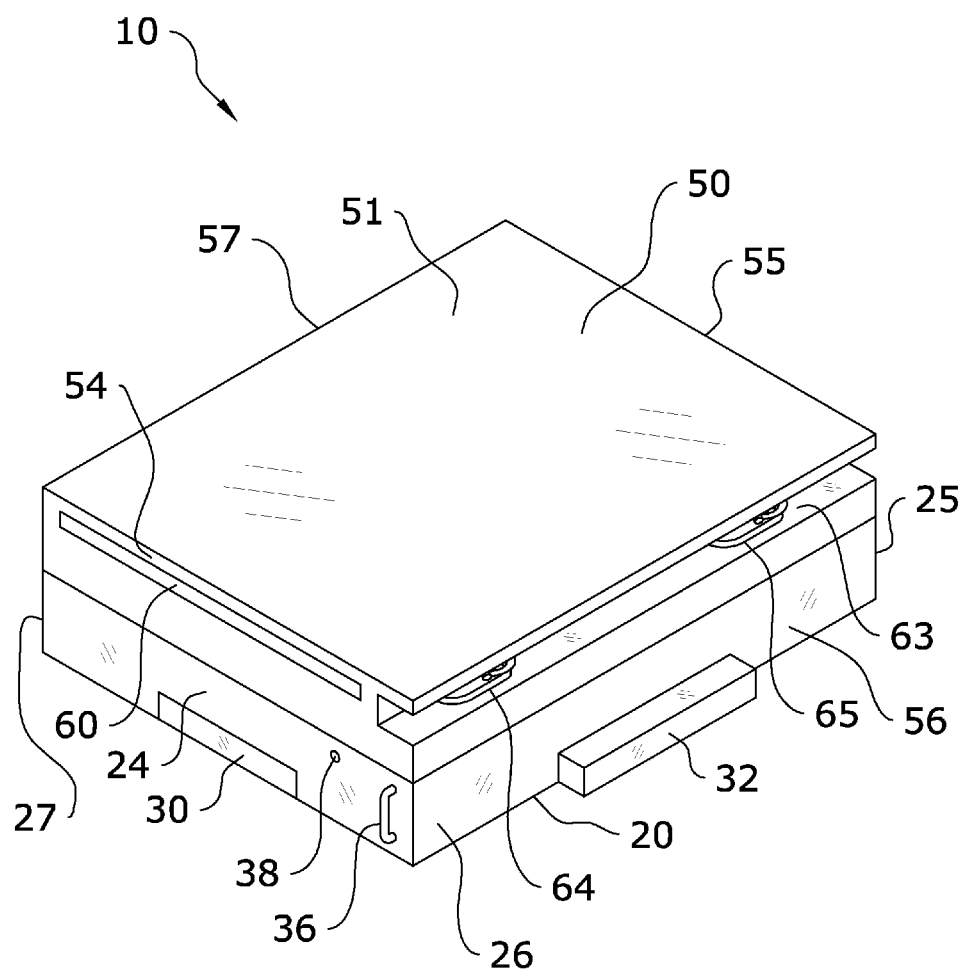
FIG. 2 is a second side upper perspective view of the present invention in a closed configuration.

Turning now descriptively to the drawings, in which similar reference characters denote similar elements throughout the several views, FIGS. 1 through 10 illustrate a mobile work station system 10, which comprises a case including a first portion 20 and a second portion 50. The first portion 20 is hingedly secured to the second portion 50. A pair of cup holders 30, 31 extend from either side 24, 25 of the first portion 20 for storing various beverages therein. A pair of dry-erase boards 60, 61 extend from either side 54, 55 of the second portion 50 in a retractable manner. An attachment receiver 34 is positioned on the lower end 22 of the first portion 20 for attaching a tripod attachment 80. A pair of mounting members 64, 65 are positioned within a slot 63 formed in the second portion 50 for suspending the present invention from various structures, such as a fence.

B. Case

Figure 9:
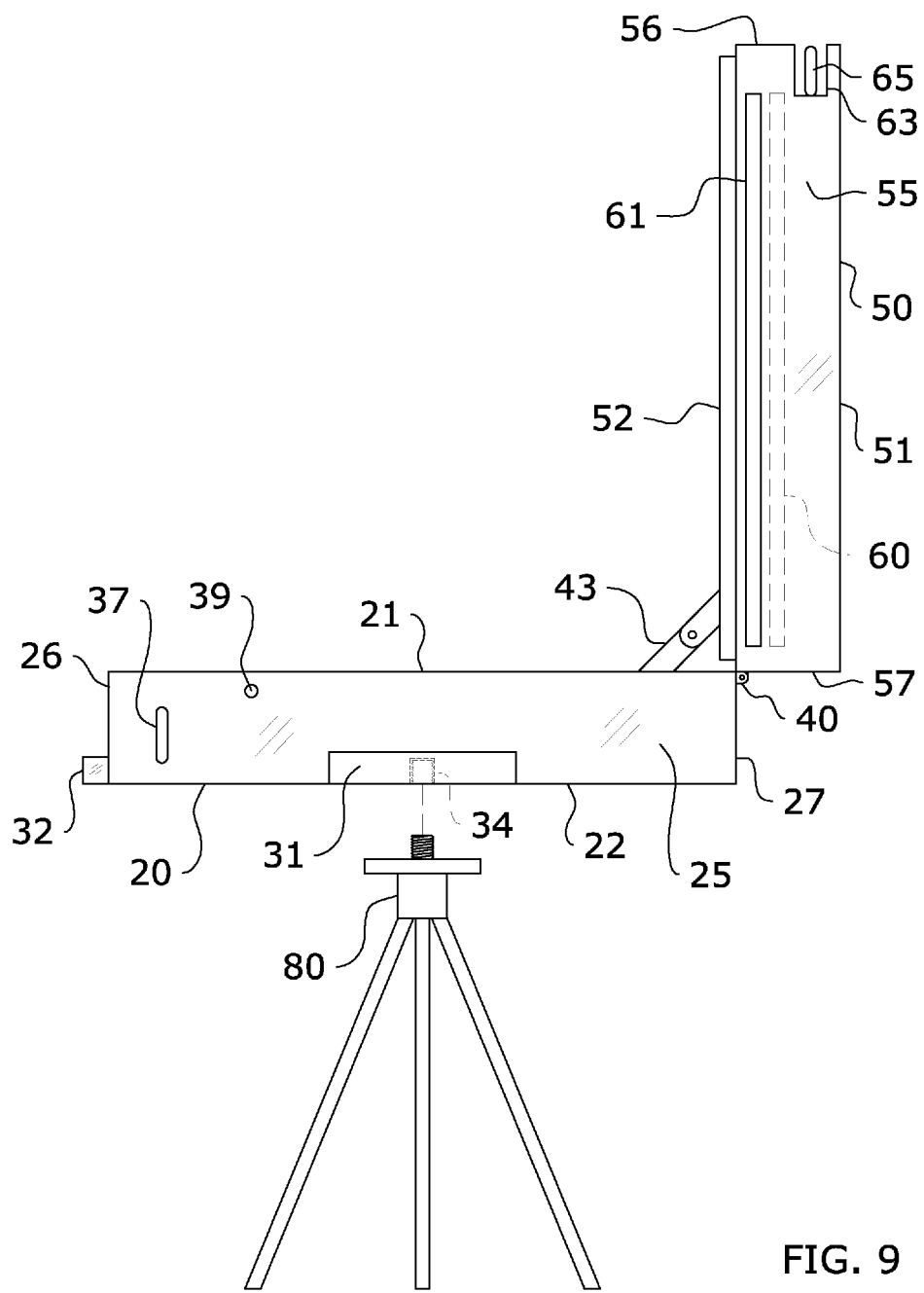
FIG. 9 is a side view of the present invention illustrating alignment with a tripod attachment.

As shown throughout the figures, the present invention comprises a case 10 which is comprised of a first portion 20 hingedly secured to a second portion 50. The first portion 20 generally comprises the lower half of the case 10 and the second portion 50 generally comprises the upper half of the case 10. The first and second portions 20, 50 are hingedly connected by a hinge 40 as best shown in FIG. 9. A first stopper 42 and a second stopper 43 also link the two portions 20, 50 to prevent them from opening past a right angle with respect to each other.

i. First Portion.

The first portion 20 is generally comprised of a rectangular shape and includes an upper end 21, a lower end 22, a first side 24, a second side 25, a front end 26, and a rear end 27. An internal compartment 23 is formed within the upper end 21 of the first portion 20. The internal compartment 23 may be utilized for storing or supporting various items, such as a television, notebooks, and the like.

Figure 3:
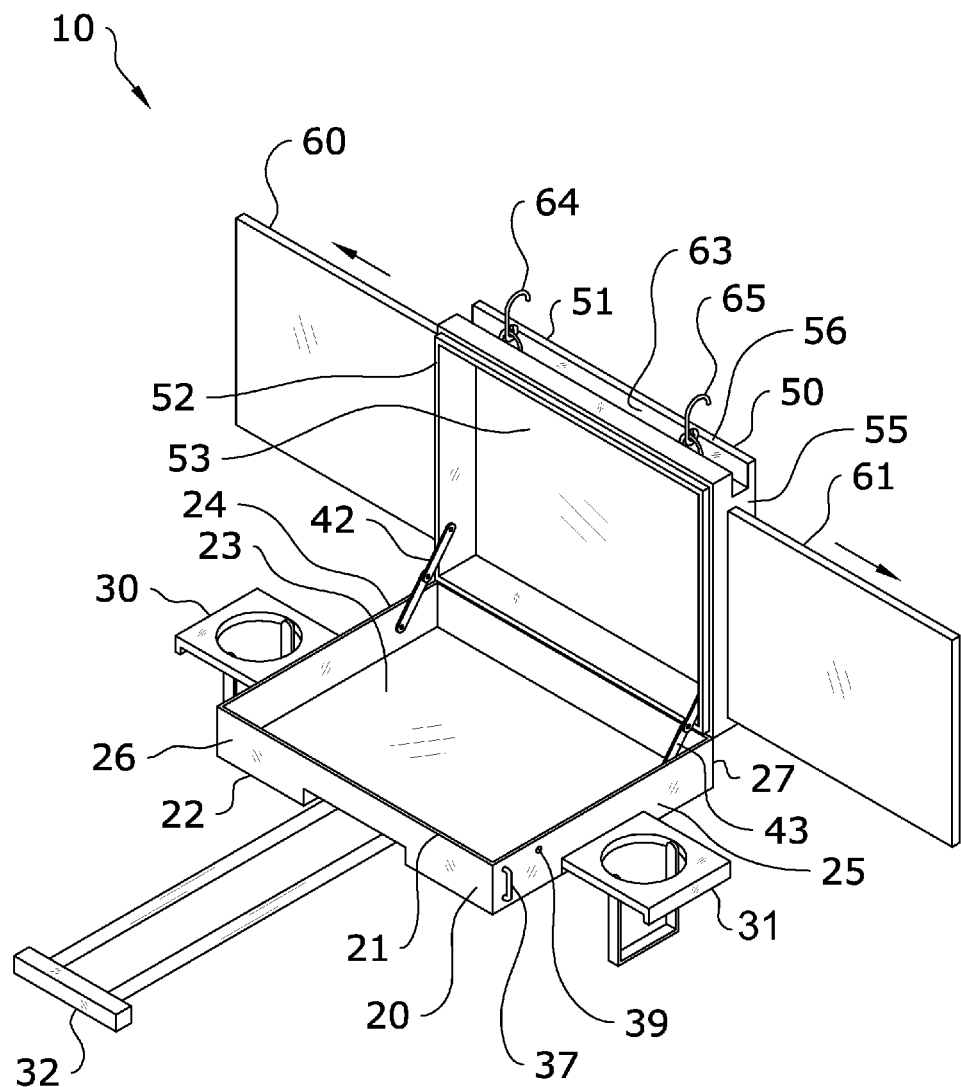
FIG. 3 is an upper perspective view of the present invention in an opened configuration.
Figure 4:
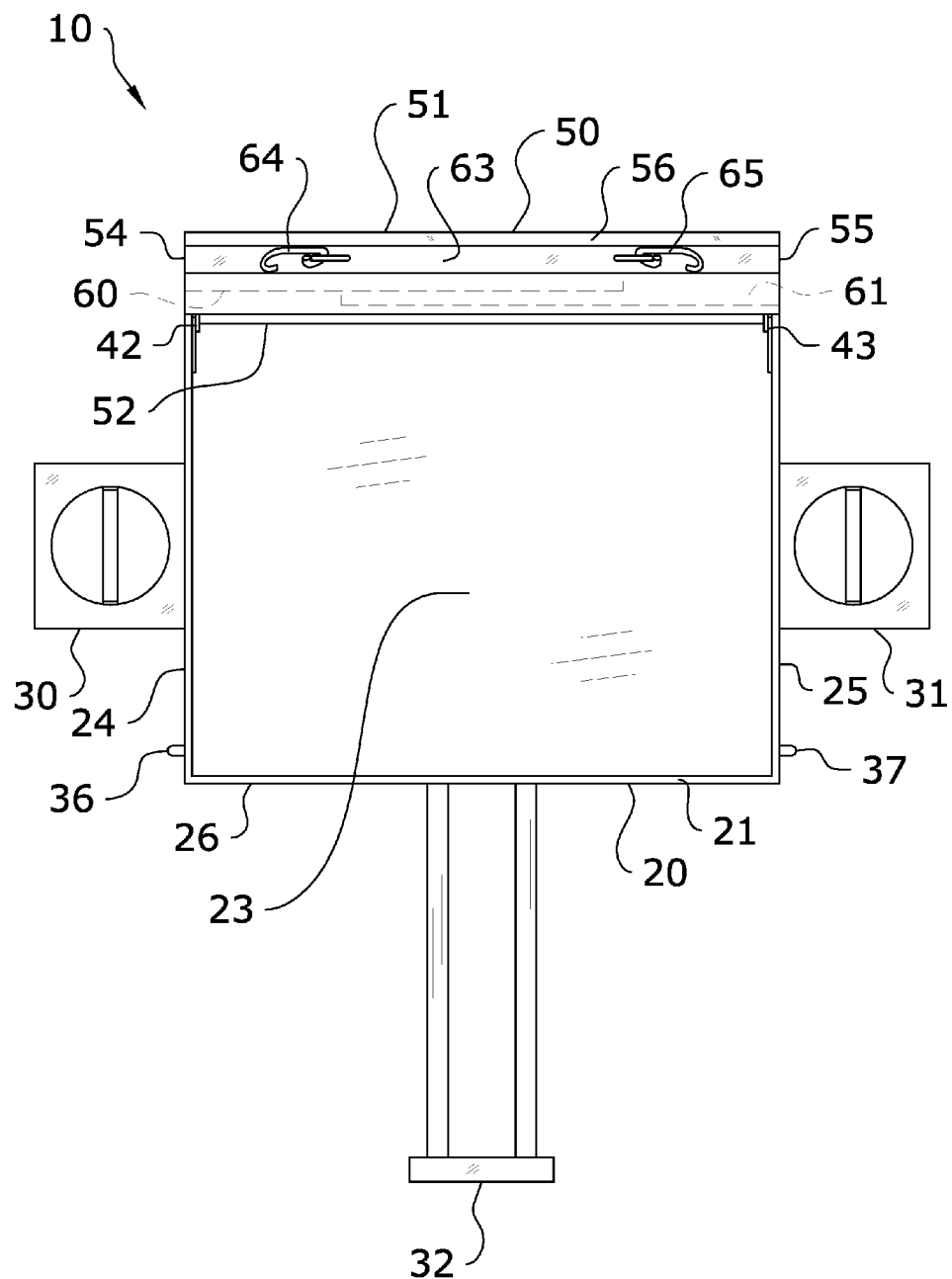
FIG. 4 is a top view of the present invention in an opened configuration.
Figure 5:
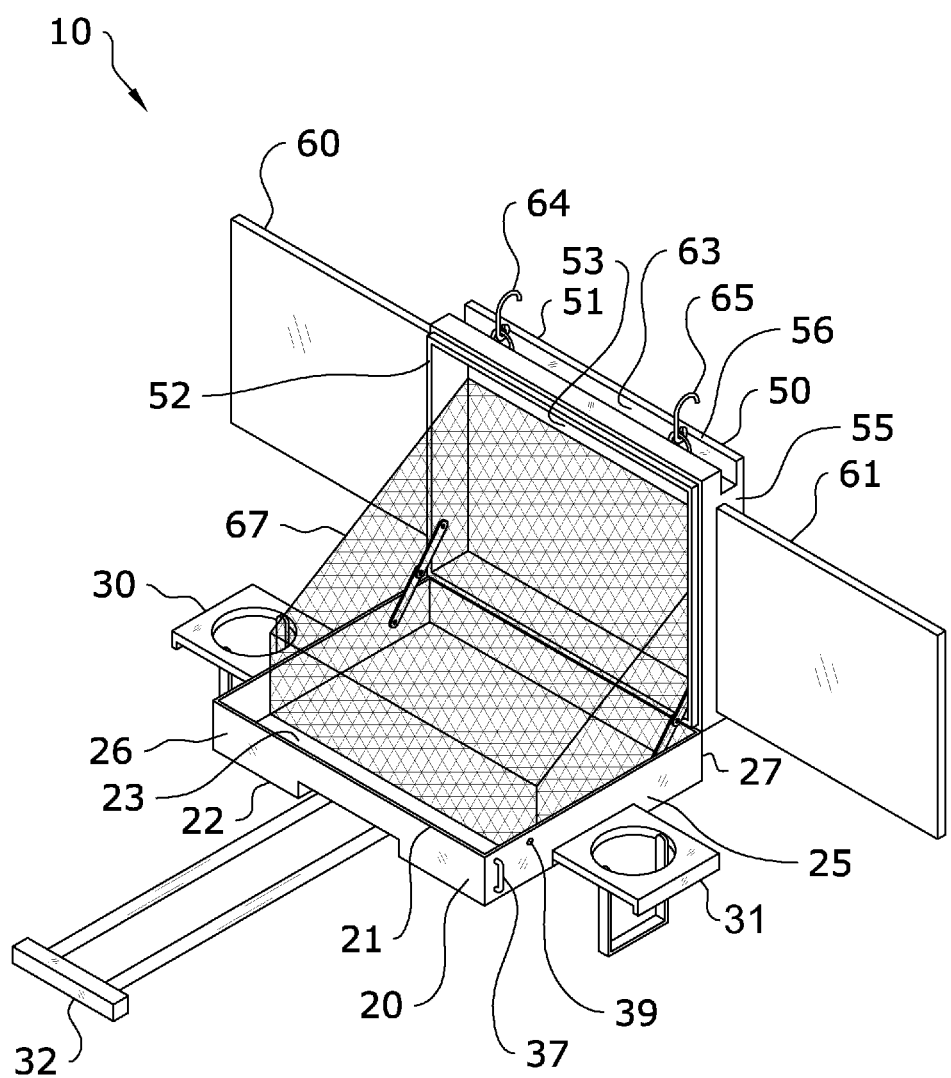
FIG. 5 is an upper perspective view of the present invention in an opened configuration with the protective net deployed.

As best shown in FIGS. 3 and 4, the first portion 20 will preferably include at least one cup holder 30 extending from its body. While the figures illustrate the cup holder 30 extending from a first side 24 of the first portion 20, the cup holder 30 may be positioned at various other locations. Various types of cup holders 30 may be utilized to accommodate a wide range of types of cups.

In a preferred embodiment, a first cup holder 30 will extend from a first side 24 of the first portion 20 and a second cup holder 31 will extend from a second side 25 of the first portion 20. Preferably, the cup holders 30, 31 will each be slidably positioned on the first portion 20 so that they may be extended into a first position for use and retracted into a second position for storage.

The first portion 20 will also generally include a handle 32 extending therefrom to aid with carrying the case 10 when it is closed and being transported. The handle 32 will preferably be telescopically adjustable between a first, refracted position and a second, extended position. Preferably, the handle 32 will extend from the front end 26 of the first portion 20 as shown. While the figures illustrate the handle 32 extending from the first portion 20, it is appreciated that in some embodiments the handle 32 may extend from the second portion 50.

Figure 10:
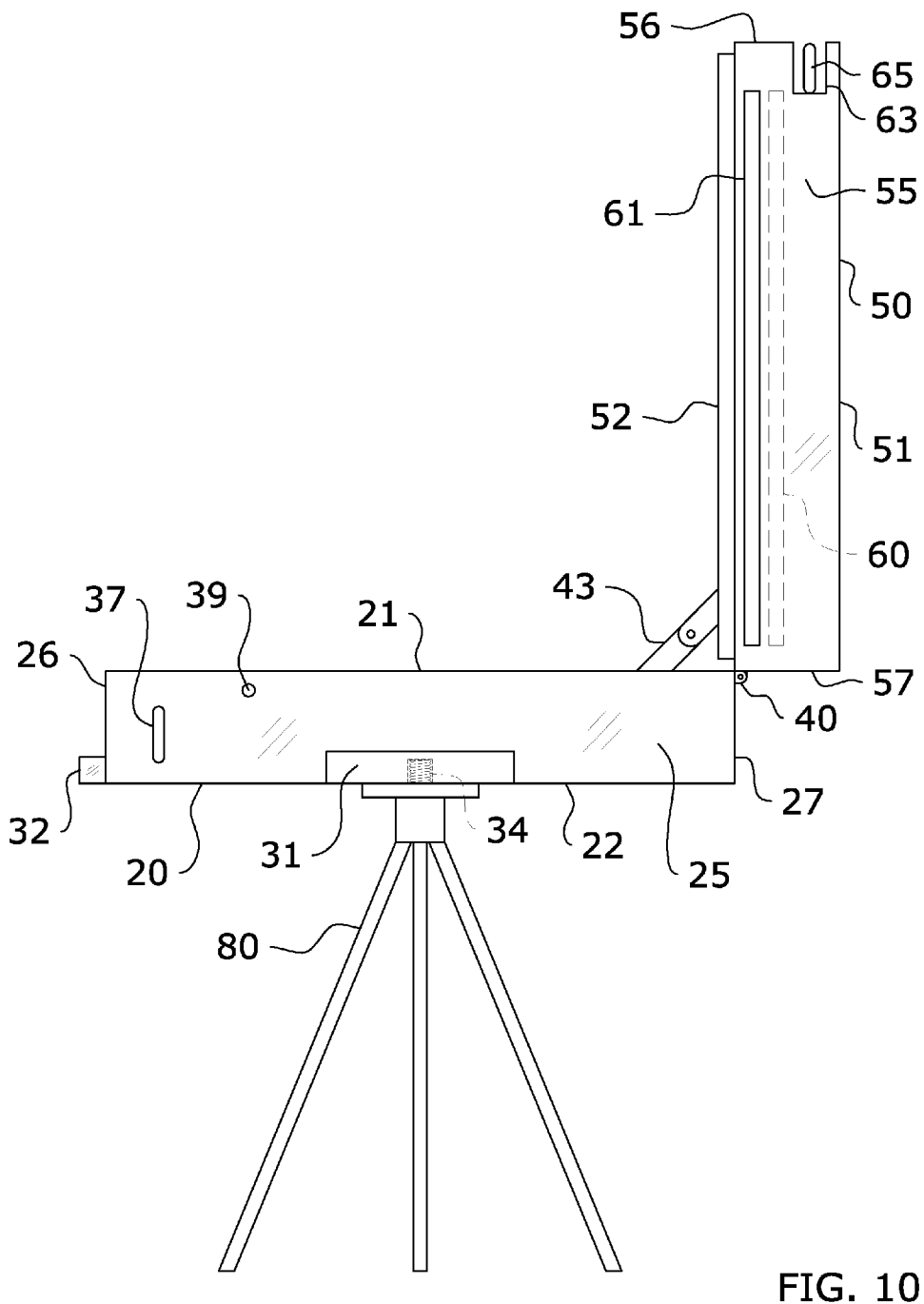
FIG. 10 is a side view of the present invention secured to a tripod attachment.

The lower end 22 of the first portion 20 will generally include an attachment receiver 34 adapted to removably secure an attachment thereto. While the figures illustrate the attachment receiver 34 being comprised of a threaded aperture, other structures may be utilized such as clamps, clasps, brackets, and the like. FIGS. 9 and 10 illustrate usage of one such attachment. The tripod attachment 80 shown therein may be removably secured to the lower end 22 of the first portion 20 to act as a stand so that the present invention may be raised in elevation.

Figure 7:
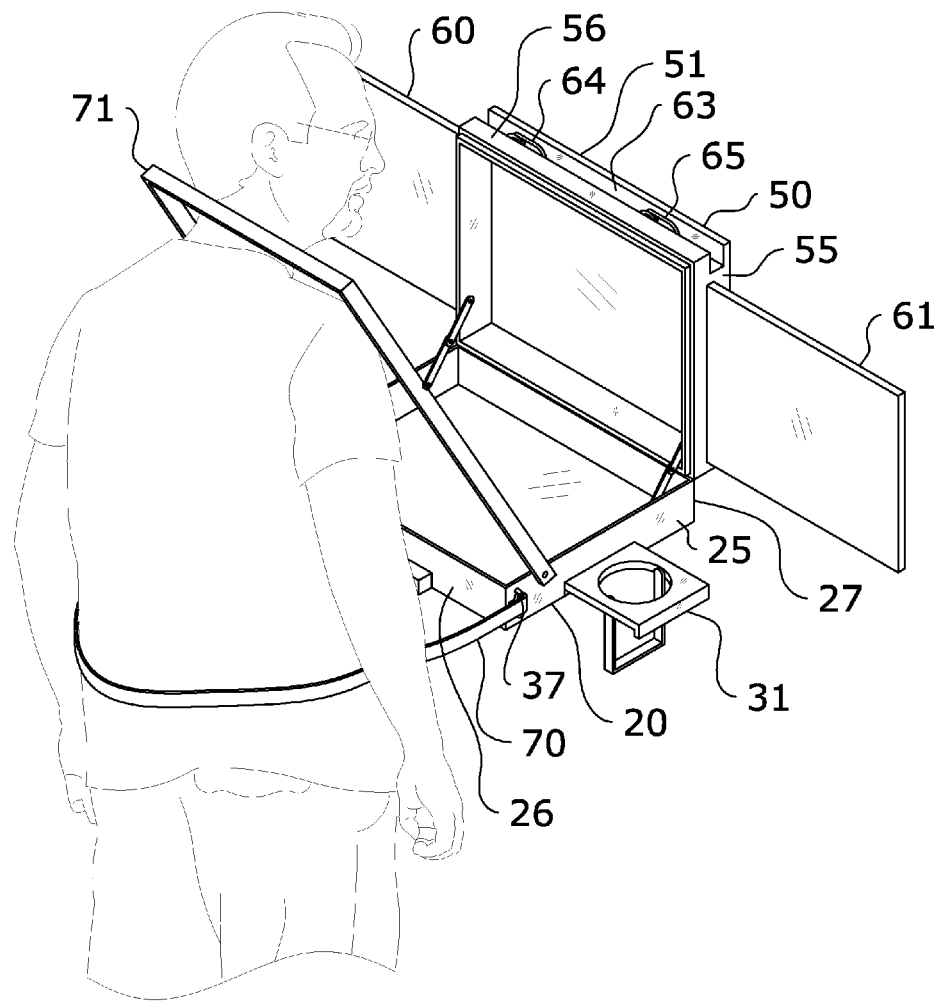
FIG. 7 is an upper perspective view of the present invention in an opened configuration being worn by a user.
Figure 8:
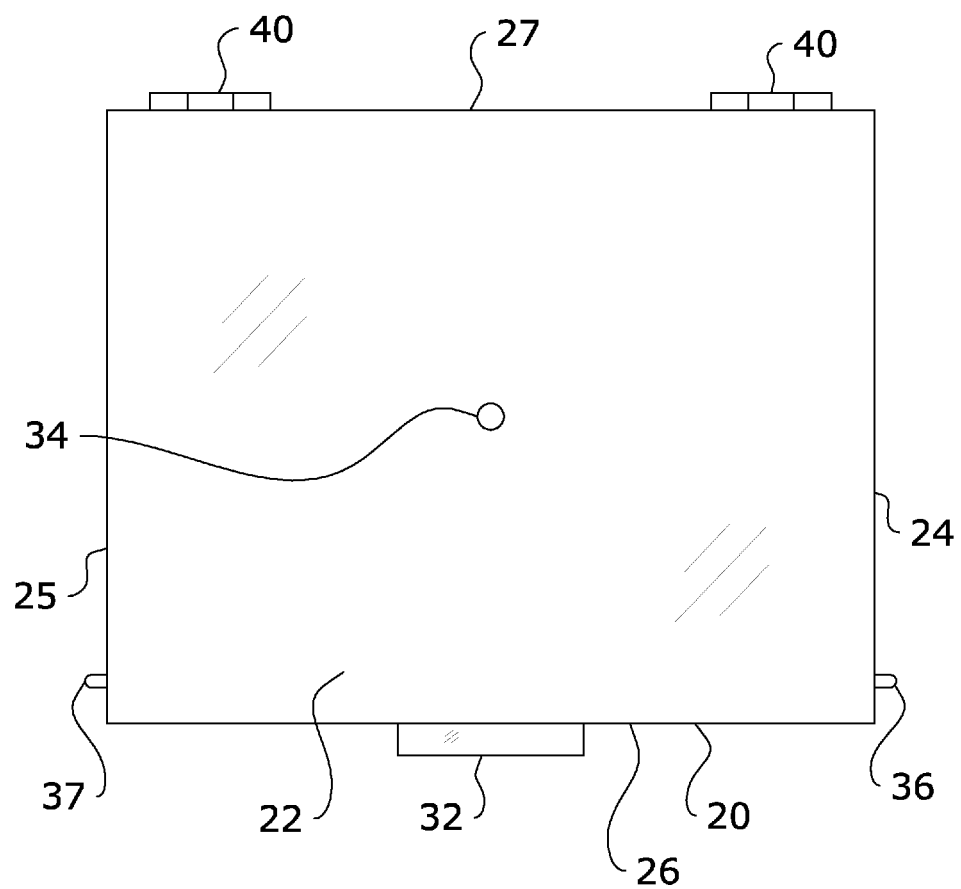
FIG. 8 is a bottom view of the present invention.

The first portion 20 may also include a pair of strap retainers 36, 37 and a pair of bar retainers 38, 39. As best shown in FIG. 4, a first strap retainer 36 will be positioned on a first side 24 of the first portion 20 and a second strap retainer 37 will be positioned on a second side 25 of the first portion 20. The strap retainers 36, 37 are generally comprised of rings, clasps, or other devices to which a waist strap 70 may be removably secured as shown in FIG. 7.

The bar retainers 38, 39 are generally comprised of apertures extending into the first portion 20 for removably retaining a neck bar 71. A first bar retainer 38 will generally be positioned on a first side 24 of the first portion 20 and a second bar retainer 39 will generally be positioned on a second side 25 of the first portion 20. As best shown in FIG. 7, a neck bar 71 may be secured to the bar retainers 38, 39 which, in combination with the waist strap 70, may aid in transport of the present invention while in use.

ii. Second Portion.

The second portion 50 is generally comprised of a rectangular shape and includes an upper end 51, a lower end 52, a first side 54, a second side 55, a front end 56, and a rear end 57. An internal compartment 53 is formed within the upper end 51 of the second portion 50. The internal compartment 53 may be utilized for storing or supporting various items, such as a television, notebooks, and the like. The second portion 50 is generally substantially the same size and shape as the first portion 20 so that, when the first and second portions 20, 50 are closed and secured to other, a single unitary case is formed.

As best shown in FIG. 3, the second portion 50 will preferably include a first board 60 extending from a first side 54 of the second portion 50 and a second board 61 extending from a second side 55 of the second portion 50. The boards 60, 61 may be comprised of simple boards for mounting various items thereto. In a preferred embodiment, each board 60, 61 will be comprised of a dry-erase marker board. The boards 60, 61 will preferably be retractably positioned within the second portion 50 and adapted to be adjusted between a first, retracted position and a second, extended position.

Figure 6:
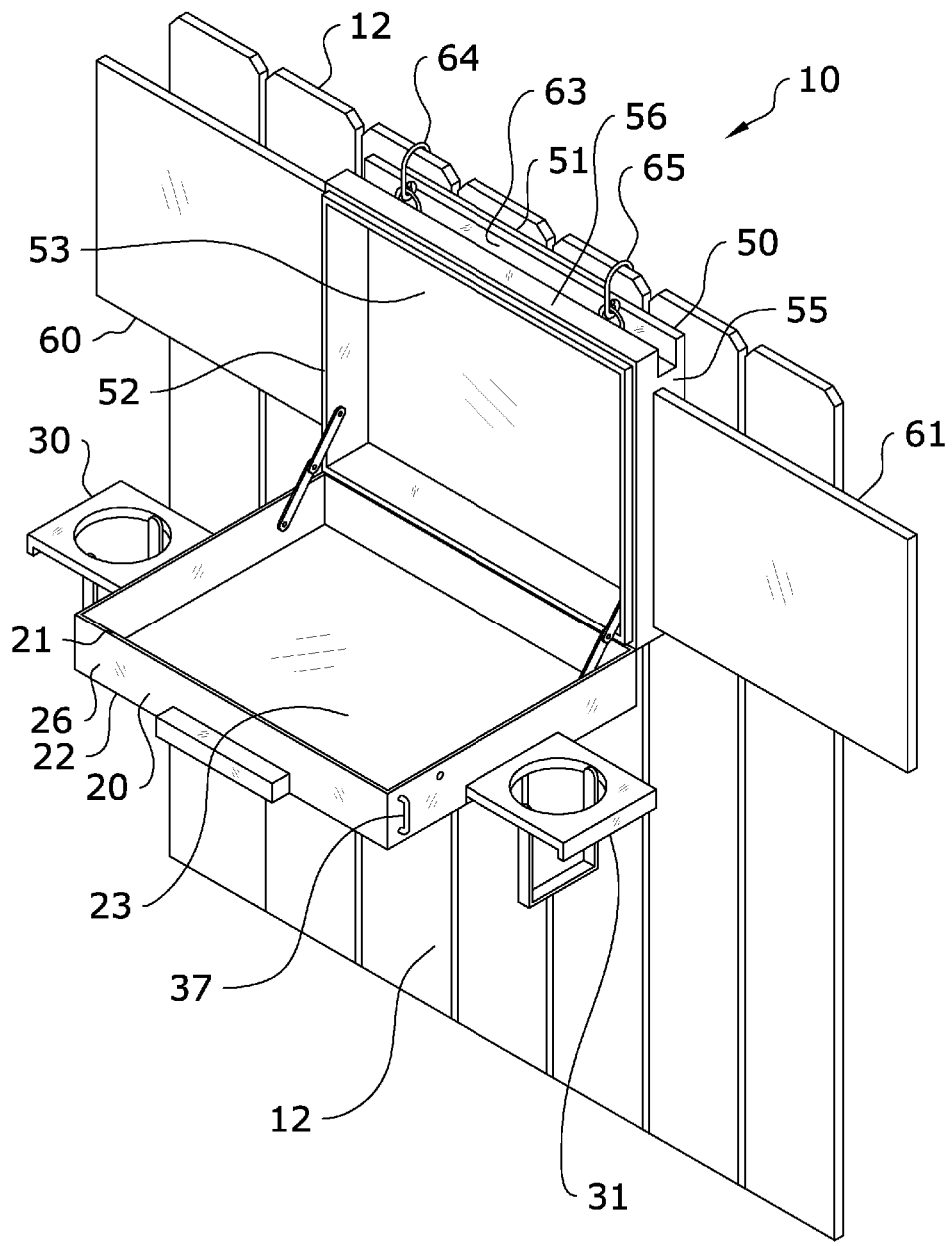
FIG. 6 is an upper perspective view of the present invention in an opened configuration suspended from a fence.

The front end 56 of the second portion 50 will generally include a slot 63 from which a pair of mounting members 64, 65 extend. The mounting members 64, 65 may be utilized to suspend the present invention from a structure such as a fence 12 as shown in FIG. 6. In a preferred embodiment, the first mounting member 64 and the second mounting member 65 will each be comprised of hooks. When the mounting members 64, 65 are not in use, they may be positioned within the slot 63.

The lower end 52 of the second portion 50 may include a protective net 67 which may be extended downwardly to cover the internal compartment 53 of the second portion 50 as well as portions of the internal compartment 23 of the first portion 20. The protective net 67 will prevent bugs or other obstructions from impacting anything stored within the first or second portions 20, 50. For example, when food is positioned in the present invention, the net 67 may be lowered to protect the food from bugs.

C. Operation of a Preferred Embodiment

The present invention may be positioned at various locations in various configurations. In one configuration, the present invention may be positioned on the ground or on another surface, opened up, and used there. In another configuration as shown in FIG. 6, the mounting members 65, 65 of the present invention may be utilized to suspend the present invention from a structure such as a fence. In another configuration as shown in FIG. 7, the waist strap 70 and neck bar 71 may be utilized in combination with each other such that the present invention may be worn on a person. In yet another configuration as shown in FIGS. 9 and 10, a tripod attachment 80 may be utilized to elevate the present invention.

The present invention may be utilized for a wide range of uses. The present invention may support computers or televisions. It may be utilized as an eating table or can hang within a sporting area so that an individual such as a coach may organize his work and have a place to write, keep notes, and organize charts.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A mobile work station, comprising:
   a case having a first portion and a second portion, wherein said first portion is hingedly connected to said second portion;
   a protective extending downwardly from a lower end of said second portion, wherein said protective net is adapted to extend diagonally between said first portion and said second portion when said first portion and said second portion are hingedly separated;
   a pair of mounting members positioned within a slot formed within said second portion, wherein said pair of mounting members are adjustable between a first position wherein said pair of mounting members extend from said slot and a second position wherein said pair of mounting members are positioned within said slot;
   at least one beverage holder retractably secured to said first portion; and
   at least one board retractably secured to said second portion.

2. The mobile work station of claim 1, wherein said at least one beverage holder is comprised of a first beverage holder retractably secured to a first side of said first portion and a second beverage holder retractably secured to a second side of said first portion.

3. The mobile work station of claim 1, wherein said at least one board is comprised of a dry erase board.

4. The mobile work station of claim 3, wherein said at least one board is comprised of a first dry erase board retractably secured to a first side of said second portion and a second dry erase board retractably secured to a second side of said second portion.

5. The mobile work station of claim 1, further comprising a handle retractably secured to a front end of said first portion.

6. The mobile work station of claim 1, wherein a lower end of said first portion includes an attachment receiver.

7. The mobile work station of claim 6, further comprising a pedestal attachment adapted to be removably retained within said attachment receiver.

8. The mobile work station of claim 7, wherein said attachment receiver is comprised of a threaded aperture.

9. A mobile work station, comprising:
   a case having a first portion and a second portion, wherein said first portion is hingedly connected to said second portion;
   a protective net extending downwardly from a lower end of said second portion, wherein said protective net is adapted to extend diagonally between said first portion and said second portion when said first portion and said second portion are hingedly separated;
   a pair of mounting members positioned within a slot formed within said second portion, wherein said pair of mounting members are adjustable between a first position wherein said pair of mounting members extend from said slot and a second position wherein said pair of mounting members are positioned within said slot;
   a first beverage holder retractably secured to a first side of said first portion;
   a second beverage holder retractably secured to a second side of said first portion;
   a first dry erase board retractably secured to a first side of said second portion;
   a second dry erase board retractably secured to a second side of said second portion; and
   at least one mounting member extending from said second portion.

10. The mobile work station of claim 9, further comprising a handle retractably secured to a front end of said first portion.

11. The mobile work station of claim 9, wherein a lower end of said first portion includes an attachment receiver.

12. The mobile work station of claim 11, further comprising a pedestal attachment adapted to be removably retained within said attachment receiver.

13. The mobile work station of claim 12, wherein said attachment receiver is comprised of a threaded aperture.

* * * * *